United States Patent [19]

Balaban et al.

[11] Patent Number: 4,689,582
[45] Date of Patent: Aug. 25, 1987

[54] PHASE-LOCK-LOOP CIRCUIT FOR A TELEVISION APPARATUS

[75] Inventors: Alvin R. Balaban, Lebanon; Steven A. Steckler, Clark, both of N.J.

[73] Assignee: RCA Corporation, Princeton, N.J.

[21] Appl. No.: 923,640

[22] Filed: Oct. 27, 1986

[51] Int. Cl.$^4$ .............................................. H04N 5/06
[52] U.S. Cl. ..................................... 331/20; 331/1 A; 331/25; 358/158
[58] Field of Search ............... 331/1 A, 10, 17, 20, 331/25; 358/146, 158

[56] References Cited

U.S. PATENT DOCUMENTS 4,484,152  11/1984  Lee ..................................... 331/1 A

OTHER PUBLICATIONS

A technical publication dated 1982 and published by RCA, Inc. Consumer Electronics Division, Indianapolis, Indiana, entitled Color Television Basic Service Data for CTC 111 series chassis.

Primary Examiner—Eugene R. Laroche
Assistant Examiner—Robert J. Pascal
Attorney, Agent, or Firm—Eugene M. Whitacre; Joseph J. Laks; Sammy S. Henig

[57] ABSTRACT

A digital phase-lock-loop circuit includes a generator that produces a horizontal rate output signal at a controlled frequency and a phase detector responsive to the output signal and to an incoming synchronizing signal. The phase detector is coupled to the generator control port via a loop filter. When the phase between the output signal and the synchronizing signal that synchronizes the phase-lock-loop circuit changes as a result of, for example, head switching in a two-head VTR that supplies the synchronizing signal, a signal representative of such phase change is produced. The phase change representative signal is fed forward to the generator, by bypassing the loop filter of the phase-lock-loop circuit. The phase change representative signal produces an immediate phase shift of the output signal such that the loop filter is not affected by the head switching.

25 Claims, 8 Drawing Figures

PHASE-LOCK-LOOP CIRCUIT FOR A TELEVISION APPARATUS

The invention relates to a phase-lock-loop circuit that is synchronized. In particular, the invention relates to synchronizing a horizontal oscillator of a television receiver by a signal obtained from, for example, corresponding playback heads of a multi-head video tape recorder (VTR).

Figure 2:
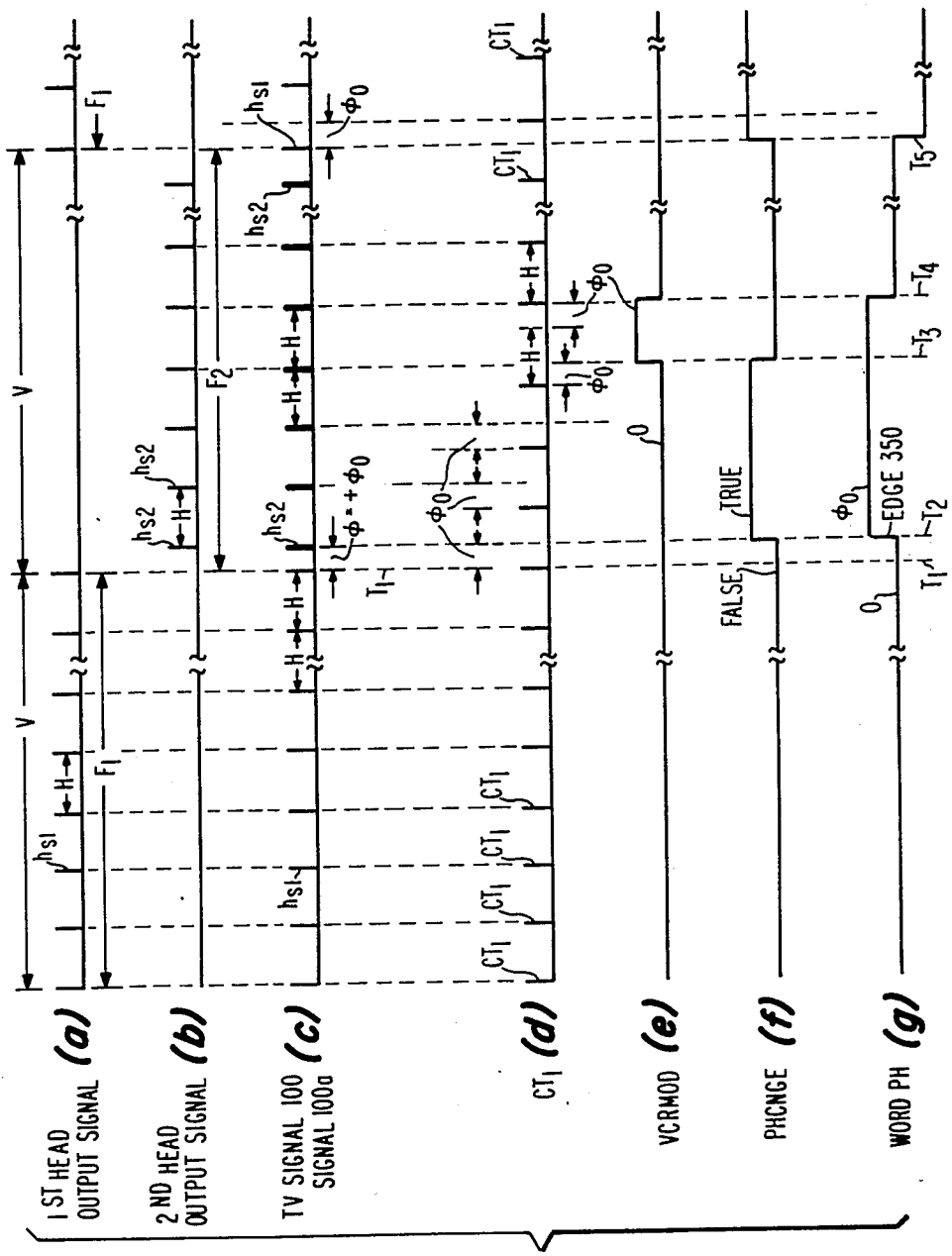

In, for example, a two-head magnetic recording and reproducing apparatus, the video signal is alternately recorded onto and reproduced from tracks oblique with respect to the longitudinal direction of the magnetic tape, by two rotary heads. The two rotary heads are disposed apart from each other by 180°. The rotation of the rotary heads is controlled so as to rotate one-half revolution in one vertical field period. When the first head, not shown in the FIGURES, reproduces a video signal that is associated with a picture field $F_1$ such as shown in FIG. 2a, no video information is obtained from the second head. On the other hand, when the second head reproduces a video signal of an immediately subsequent picture field $F_2$, such as shown in FIG. 2b, no video information is obtained from the first head. The two video signals are combined to form a TV or video signal 100 of FIG. 2c where corresponding sync pulses $h_{s1}$ of FIG. 2a are shown, schematically, in solid narrow lines and corresponding sync pulses $h_{s2}$ of FIG. 2b are shown in solid thick lines. It should be understood that during each period H of FIG. 2a, 2b and 2c, the corresponding video signal also includes a corresponding active video portion that contains picture information that is not shown in the figures.

Because of, for example, the mechanical arrangement of the heads and tape in the VTR, the horizontal sync pulses $h_{s2}$ reproduced by the second head, are phase-shifted by a phase shift $\phi$ that is different from 0°. Phase shift $\phi$ corresponds to a fraction of a horizontal period H, as shown in FIG. 2c, relative to, for example, horizontal sync pulses $h_{s1}$ that is reproduced by the first head. The frequency $f_H$ of each of sync pulses $h_{s1}$ and $h_{s2}$ associated with each of the heads is substantially the same.

In, for example, a television receiver that is used for displaying the picture information obtained from the video signal of the VTR, the horizontal sync pulses of FIGS. 2a and 2b associated with alternate picture fields $F_1$ and $F_2$ are alternately coupled via signal 100 of FIG. 2c to a synchronizing input terminal of a phase-lock-loop circuit (PLL). The PLL includes, for example, a horizontal oscillator of a horizontal deflection circuit of the receiver for synchronizing an output signal of the horizontal oscillator. During the greater portion of each corresponding vertical interval V, the output signal of the oscillator is in phase with the corresponding sync pulses $h_{s1}$ and $h_{s2}$.

Such PLL may be, typically, designed to have a relatively slow tracking response time to the horizontal sync pulses $h_{s1}$ or $h_{s2}$ by using a low-pass loop filter having a relatively large time constant. The large time constant is desirable because it prevents a noise related signal that may be included in the horizontal sync pulses of signal 100 of FIG. 2c from substantially affecting the phase of the PLL output signal. However, such large time constant, disadvantageously, causes the PLL, to track in a slow manner changes in the aforementioned phase shift $\phi$. Phase shift $\phi$ occurs after, for example, time $T_1$ of FIG. 2c, when sync pulses $h_{s1}$ associated with the first head are, for example, switched-out and pulses $h_{s2}$ associated with the second head are switched-in, within signal 100. If such slow response time is not speeded-up after instant $T_1$, a distortion in the picture formed by TV video signal 100 may occur. For example, a picture that is supposed to contain a straight vertical bar will, contain, as a result of the slow tracking, a bar that is vertical but that is slightly bent, or curved at, for example, the top of the picture. Such bending occurs because of a transient change in the frequency of the output signal of the horizontal oscillator of the PLL. The change in the frequency after instant $T_1$ occurs in order to track pulses $h_{s2}$ in signal 100 of FIG. 2c that are phase shifted by phase shift $\phi$ relative to the phase of the output signal of the oscillator.

Phase shift $\phi$ of the sync pulses changes from a steady state value that is, for example, approximately 0° prior to instant $T_1$ to a value $\phi_0$, after instant $T_1$. As is well known, a transient oscillator response is produced by the PLL in order to track or effectuate the corresponding phase shift $\phi$ in the output signal. As part of the response process, the frequency of the oscillator output signal may initially deviate from the steady state value $f_H$ and then return to its value $f_H$, that existed prior to such deviation.

In one prior art circuit the problem associated with tracking phase shift $\phi$ by the output signal of the oscillator is eliminated or reduced by using a variable time constant in the low-pass filter of the PLL. When the video signal is obtained from the VTR, a user will activate a manually operated switch that causes a reduction in the time constant of loop filter of the PLL. A disadvantage of such solution is that such PLL is susceptible to perturbation caused by noise.

In another prior art circuit, the time constant of the low-pass filter of PLL is automatically reduced only during vertical retrace to speed up the PLL response time when the switching in and out of the corresponding groups of sync pulses $h_{s1}$ and $h_{s2}$ occurs.

In accordance with an aspect of the invention, a phase-lock-loop circuit of a television apparatus includes a source of a synchronizing input signal at a given phase. A controllable generator responsive to the input signal generates a periodic output signal at a frequency that is related to the frequency of the input signal and at a phase that is controlled in accordance with the given phase of the input signal. A phase detector responsive to the output and input signals produces a signal that is indicative of a phase difference therebetween. A low-pass filter responsive to the phase difference indicative signal produces a first signal that is coupled to the generator to form a feedback loop path for controlling the phase of the output signal. When a change between the given phase of the input signal and the phase of the output signal occurs, the first signal varies to cause a corresponding change in the phase of the output signal in a manner that reduces the phase difference between the input and output signals. In this way the output signal is synchronized to the input signal. A second signal is generated when the change in the phase difference indicative signal occurs that meets a predetermined criterion. The second signal is coupled to the generator to cause at least a portion of the change in the phase of the output signal that synchronizes the output to the input signal.

In accordance with another aspect of the invention, when the input signal is derived from the VTR after head switching occurs in the VTR, the portion of the change in the phase of the output signal that is caused by the second signal is performed abruptly in a manner that bypasses the low-pass filter. Bypassing the low-pass filter, advantageously, prevents the response time of the feedback loop path, that may be slow, from substantially increasing the time it takes to the output signal to be synchronized to the input signal.

Figure 1:
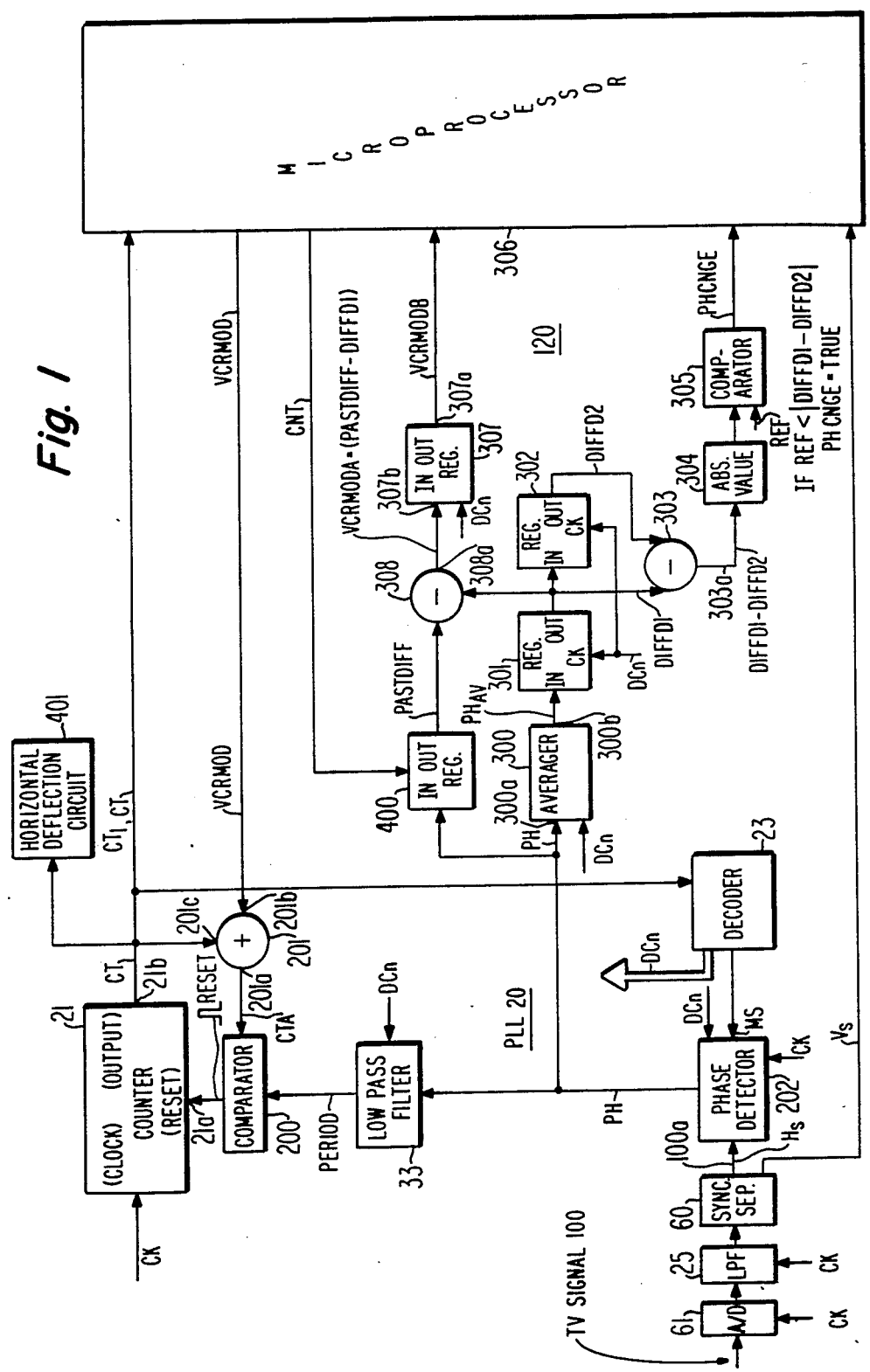

FIG. 1 illustrates a block diagram of a circuit embodying an aspect of the invention; and FIGS. 2a–2g illustrate, schematically, timing diagrams associated with the circuit of FIG. 1.

FIG. 1 illustrates a block diagram of a PLL 20, and of a loop filter bypassing arrangement 120, embodying the invention. PLL 20 includes a counter 21 that produces a count or an output word CT at a port 21b of counter 21. Word CT is coupled to a horizontal deflection circuit 401 to control the timing of corresponding horizontal deflection cycles. Arrangement 120 and PLL 20 may be utilized in television circuitry other than the horizontal deflection circuit, in situations where synchronization is required. Counter 21 has the analogous function of a VCO of a conventional analog type PLL that generates an output signal at, for example, the frequency $f_H$ and that is synchronized to a horizontal sync signal. Output word CT of counter 21 is incremented after each leading edge of a clock CK having a period $t_{CK}$. Counter 21 counts up, or changes state from an initial state that corresponds with, for example, word CT=1, each time clock CK occurs until it is reset to the initial state.

Word CT is also coupled to an input port 201c of an adder 201 that sums word CT with a phase modifying word VCRMOD to produce at an output port 201a of adder 201 a word CTA, representing the state of counter 21 as modified by word VCRMOD. A word PERIOD, that is analogous to a control voltage of the VCO of the conventional PLL, is coupled to a comparator 200 that compares the current value of word CTA to that of word PERIOD and generates a pulse RESET at an input terminal 21a of counter 21 that initializes counter 21 when word PERIOD is equal to word CTA. Pulse RESET causes counter 21 to reset to the initial value that, for example, corresponds with word CT=1. Each word CT supplies in a given sequence N, that occurs between successive pulses RESET, the present count, or state, of counter 21. The rate by which, for example, word CT=1 recurs defines the frequency of word CT that is analogous to the frequency of the output signal of the VCO of the conventional PLL. Thus, word PERIOD controls, via pulse RESET the period, frequency and phase of word CT. The length of the period of word CT that is controlled by word PERIOD is defined by the number of clock CK periods $t_{CK}$ that are included between successively occurring pulses RESET. As described later on, when head switching in the VTR occurs, the value of word VCRMOD is changed, to produce an abrupt change in the phase of word CT.

Baseband television signal 100 of FIG. 2c, which may be of any one of the various television signal formats, is digitized in an analog-to-digital converter 61 of FIG. 1 and then low-pass filtered in a low-pass filter 25. The low-pass filtered signal is coupled to a sync separator 60 that generates a digitazed signal 100a that includes horizontal sync pulses $H_s$.

Horizontal sync pulses $H_s$ having a period H are coupled to an input port of a phase detector 202 of FIG. 1.

An example of such phase detector that is included in a digital PLL is described in U.S. Pat. No. 4,639,780, entitled TELEVISION SYNCHRONIZING APPARATUS, in the name of D. H. Willis, filed Apr. 1, 1985, that is incorporated by reference herein.

A decoder 23 generates timing and control signals $DC_n$ and a pulse MS when predetermined corresponding values of word CT are detected. Pulse MS is indicative of the phase of word CT. As described in the Willis patent application, when PLL 20 is phase-locked to sync pulses $H_s$, the leading edge of each pulse MS that is coupled to phase detector 202 occurs, for example, substantially coincidentally with the last clock CK edge that occurs before the center of the corresponding sync pulse $H_s$.

Phase detector 202 generates a phase difference word PH, in accordance with a phase difference between sync pulses $H_s$ and word CT. Phase difference word PH, that is analogous to an output of a phase detector of the conventional PLL, is coupled to a lowpass, or loop filter 33, that is analogous to the loop filter of the conventional PLL. Loop filter 33 generates word PERIOD, that controls the phase and frequency of word CT, by summing up successively generated phase words PH. Each of detector 202 and filter 33, that utilize digital techniques is controlled by a corresponding control signal $DC_n$ that is, like pulse MS, produced in accordance with timing information obtained from word CT. For example, the corresponding control signal $DC_n$ that is coupled to detector 202 determines the time when word PH is updated.

In steady state operation of PLL 20, each phase difference word PH of phase detector 202 is substantially zero. This maintains word PERIOD, in steady state, substantially constant. It should be understood that in other embodiments of the invention, that are not shown in the FIGURES, the PLL may be designed such that, in steady state operation, the phase detector output word is nonzero, in order to maintain word PERIOD constant.

During transient operation, phase difference word PH varies. The variation of word PH causes a change in word PERIOD that, in turn, causes a phase shift in word CT. The phase shift synchronizes word CT to sync pulse $H_s$.

FIGS. 2a–2g illustrate timing diagrams useful in explaining the operation of loop filter bypassing arrangement 120 and of PLL 20 of FIG. 1. Similar symbols and numerals in FIGS. 1 and 2a–2g illustrate similar items or functions.

FIG. 2c, that was mentioned before, also illustrates, schematically, sync pulses $h_{s1}$ and $h_{s2}$ of sync pulses $H_s$ of FIG. 1, when signal 100 originates in the VTR that is not shown in the figures. When pulses $h_{s1}$ of FIG. 2c are produced by the first head of the VTR that occurs prior to instant $T_1$, a given pulse $h_{s1}$ is separated from the next one by an interval that is equal to period H.

Immediately after instant $T_1$ of FIG. 2c, a given pulse $h_{s2}$, drawn in thick solid lines in FIG. 2c that originates from the second head of the VTR, is separated from, for example, the following pulse $h_{s2}$ by an interval that is also equal to period H. However, the pulse $h_{s2}$ that occurs immediately after instant $T_1$ is phase-shifted the amount of phase shift $\phi$ is equal to, for example, the value $\phi_0$ relative to the pulse $h_{s1}$ that occurs immediately before instant $T_1$.

FIG. 2d illustrates, schematically, the timing of a predetermined word $CT_1$ having a predetermined value. Illustratively, each time word $CT_1$ occurs, a given sequence N ends, that is associated with a corresponding cycle of word CT of counter 21 of FIG. 1, and the next subsequent sequence begins. Each word $CT_1$ of FIG. 2d that occurs prior to instant $T_1$ is in phase with the corresponding pulse $h_{s1}$ of FIG. 2c. Therefore, phase difference word PH of FIG. 2g is zero. After instant $T_1$, pulses $h_{s2}$ are phase shifted relative to the corresponding words $CT_1$ of FIG. 2d. Until instant $T_4$, when word $CT_1$ is caused to be in phase again with pulses $h_{s2}$, due to operation of PLL 20 and arrangement 120 of FIG. 1, word PH of FIG. 2g contains the value $\phi_0$. Thus, word PH of FIG. 2g may be, schematically, illustrated as, for example, a pulse having a leading edge 350 that occurs, at an instant $T_2$ after instant $T_1$ and an amplitude that corresponds to the magnitude of word PH. Word PH changes slowly in value from time $T_2$ to time $T_4$ due to the slow response time of PLL 20.

As described later on, except for a short interval when the VTR head switching occurs, word VCRMOD of FIG. 1 contains a constant such as, illustratively, zero. If word VCRMOD is zero, counter 21 is reset and the next word CT of counter 21 is equal to 1, the initial counting state, when word CT of counter 21 is equal to word PERIOD. Thus, as explained before, word PERIOD expresses, in multiples of clock CK periods $t_{CK}$ the length of sequence N of counter 21. It should be understood that the length of sequence N may be a noninteger multiple of period $t_{CK}$. When the VTR head switching occurs, word VCRMOD will assume a nonzero value that will cause an abrupt phase shift of word CT, with the phase shift having the magnitude $\phi_0$.

For a given value of word PERIOD, the phase of words CT can be changed by varying the value of word VCRMOD from its steady state value that is zero. Word VCRMOD that is different from zero occurs, as described later on, when the VTR head switching occurs. The nonzero value of word VCRMOD will cause a corresponding change of the time within sequence N of counter 21 when word CTA becomes equal to word PERIOD. Pulse RESET, that is generated when word CTA is equal to word PERIOD, produces an abrupt phase shift in word CT that is in accordance with the value of word VCRMOD.

In accordance with a further aspect of the invention, as described later on, a value of phase modifying word VCRMOD of FIG. 2e that is representative of the value $\phi_0$ is applied to port 201b of FIG. 1 by loop filter bypassing arrangement 120 to cause an abrupt change in the phase of word CT such as, for example, word $CT_1$ of FIG. 2d that occurs after instant $T_4$. The change in phase of word $CT_1$ is illustratively, equal to the value $\phi_0$ so as to cause word CT to be immediately in phase with the corresponding pulse $h_{s2}$ of FIG. 2c. Except for one short interval during the vertical scanning interval, when word VCRMOD causes the change in the phase of word $CT_1$, word VCRMOD is zero. Without the operation of arrangement of FIG. 1, when the phase of pulses $H_s$ change, PLL 20 would have adjusted the phase of words $CT_1$ of FIG. 2d to be equal to, for example, that of corresponding pulses $h_{s2}$ of FIG. 2c by varying word PERIOD of FIG. 1 in a relatively slow transient manner that is a function of PLL 20 response time and that is determined by filter 33. The elimination, or reduction, of the slow transient variation in word PERIOD is desirable for preventing such long settling time of PLL 20 that may cause picture distortion, as described before. When the transient variation in word PERIOD is reduced, the phase of, for example, word $CT_1$ of FIG. 2d tracks in a fast manner the above-mentioned phase shift $\phi$ having the value $\phi_0$ that is caused by the head switching in the VTR. Advantageously, the phase change by the value $\phi_0$, that is caused by applying the nonzero value of word VCRMOD of FIG. 2e, prevents the occurrence of the undesirable long transient variation in word PERIOD of FIG. 1.

Word VCRMOD of FIG. 1 is generated in loop filter bypassing arrangement 120, embodying another aspect of the invention, as will now be described. In arrangement 120, phase difference word PH of phase detector 202 of PLL 20 is coupled to an input port 300a of an averager 300 that generates, in a conventional manner, one corresponding word $PH_{AV}$ in each horizontal period H. Word $PH_{AV}$ is representative of a running average of, for example, three lastly received words PH that occurred in corresponding three preceding periods H. Thus, averager 300 operates as a lowpass filter, but one having a cutoff frequency that is substantially higher than that of filter 33.

Each word $PH_{AV}$ is stored, in the corresponding period H, in a register 301 under the control of the corresponding control signal $DC_n$ to produce a word DIFFD1. In the immediately following period H, word DIFFD1 is transferred to, and stored in a register 302 to produce a word DIFFD2 that is stored under the control of the corresponding control signal $DC_n$. Thus, words DIFFD1 and DIFFD2 represent, at a given instant, a pair of running averages of words PH that are separated by horizontal period H. Words DIFFD1 and DIFFD2 are coupled to corresponding input ports of a subtractor 303 that produces a word 303a that is representative of the difference between the pair. Word 303a that is indicative of the occurrence of a change in phase word PH, is coupled to an arrangement 304 that produces the absolute value of word 303a. When the absolute value of word 303a, that is indicative of the magnitude of the phase change, or the rate of change of word PH, exceeds a threshold level indicative signal REF, a comparator 305 produces a logic signal PHCNGE in a TRUE state. Signal PHCNGE is used for detecting the time within the vertical scanning interval when, as a result of head switching in the VTR, word VCRMOD is to be generated at the nonzero value to cause the abrupt phase shift of word $CT_1$ of FIG. 2d.

Signal PHCNGE is coupled to a microprocessor 306 of FIG. 1 that tests for the occurrence of signal PHCNGES=TRUE. The condition of signal PHCNGE=TRUE, that occurs after instant $T_2$ of FIG. 2f, is indicative of phase shift $\phi$ having a magnitude that exceeds the threshold level represented by signal REF of FIG. 1. A change in phase shift $\phi$ that is smaller, will not activate arrangement 120; therefore, it is the transient change in word PERIOD that will cause PLL 20 to be synchronized to signal $H_s$, in accordance with the response that is determined by filter 33. After detecting the condition, signal PHCNGE=TRUE, microprocessor 306 tests signal PHCNGE for detecting the occurrence of signal PHCNGE=FALSE. Signal PHCNGE=FALSE is indicative of a stable phase shift $\phi$ having a rate of change that is lower than a second threshold level. The second threshold level may be smaller than, or equal to, the threshold level represented by signal REF.

Assume the phase shift $\phi$ of FIG. 2g stabilzes immediately after the change at instant $T_2$. Consequently, after corresponding number of periods H that is determined by averager 300 of FIG. 1, word $PH_{AV}$ will have a constant value. Because word 303a represents a change in words $PH_{AV}$, word 303a, that occurs after word $PH_{AV}$ becomes constant, will be zero, such as at instant $T_3$ of FIG. 2f. Thus, the condition, signal PHCNGE=FALSE, that occurs after instant $T_3$ is indicative of phase shift $\phi$ that is constant, or stable. Phase shift $\phi$ that is substantially constant is caused by, for example, the VTR head switching, as described before; whereas, a varying phase shift may occur when PLL 20 of FIG. 1 is not in steady state operation such as during tracking of pulses $H_s$.

After instant $T_3$ of FIG. 2f, when the condition, signal PHCNGE=FALSE, is detected, microprocessor 306 of FIG. 1 will supply word VCRMOD at port 201b of adder 201, thereby bypassing loop filter 33. Word VCRMOD has a value that, as described later on, will cause the phase of word $CT_1$ of FIG. 2d to change by the value $\phi_0$ at instant $T_4$. Therefore, after the phase change, word $CT_1$ will again be in phase with pulses $h_{s2}$ of FIG. 2c due to the operation of arrangement 120 of FIG. 1 that is outside the feed back loop of PLL 20.

Microprocessor 306 of FIG. 1 supplies the value of word VCRMOD in a manner that is now described. During steady state operation, microprocessor 306 generates a signal CNT that causes word PH to be stored in a register 400 to produce a word PASTDIFF. Word PASTDIFF contains the value of word PH when PLL 20 operates in steady state operation. Word DIFFD1, that is representative of phase shift $\phi$, and word PASTDIFF are coupled to corresponding ports of a subtractor 308 that produces, at an output port 308a a word VCRMODA that is equal to the difference between words DIFFD1 and PASTDIFF. Word VCRMODA is stored in a register 307 under the control of decoder 23 to produce a word VCRMODB. Word VCRMODB is indicative of the difference between the value of word PH, during transient state, and the value of word PH, during steady state. For a typical design of PLL 20, word PASTDIFF is, illustratively, close to zero in steady state operation. Thus, word VCRMODB is indicative of the magnitude and polarity of phase shift $\phi$ of FIG. 2g.

Immediately after detection of the condition, signal PHCNGE=FALSE, that follows the occurrence of the condition signal PHCNGE=TRUE, the phase information that is contained in word VCRMODB is used by microprocessor 306 for producing word VCRMOD of FIG. 1. Word VCRMOD is coupled to adder 201 during an interval that is determined by microprocessor 306 in accordance with the timings of word CT that is coupled to microprocessor 306. Word VCRMOD that is produced by microprocessor 306 causes, in an abrupt manner, a phase shift in, illustratively, word $CT_1$ of FIG. 2d that is equal to the value $\phi_0$. Thus, immediately after instant $T_4$, each word $CT_1$ is caused to be in phase with the corresponding pulse $h_{s2}$ of FIG. 2c by the operation of phase modifying word VCRMOD of FIG. 2e.

After effectuating the abrupt phase shift $\phi_0$ in word $CT_1$ of FIG. 2d that occurs at instant $T_4$, word VCRMOD of FIG. 2e becomes zero again. Throughout the remaining portion of each vertical scanning interval V, phase shift $\phi$ remains illustratively, zero so as not to affect the operation of PLL 20 of FIG. 1.

In accordance with yet another aspect of the invention, the phase shift in word $CT_1$ of FIG. 2d at instant $T_4$, that immediately follows the VTR head switching and that is caused by word VCRMOD of FIG. 2e, causes phase word PH of FIG. 2g to become immediately close to zero. Word PH of FIG. 1 becomes immediately close to zero because arrangement 120 causes the phase of word CT to become immediately equal to that of sync pulse $H_s$. Word PH of FIG. 1 that becomes immediate close to zero by the operation of arrangement 120 prevents the occurrence of a long transient state that is undesirable in word PERIOD, as described before.

The change in phase of words CT may alternatively, be accomplished gradually in discrete steps over a few periods H. When such phase change is done in a gradual manner, word VCRMOD is supplied with corresponding values during several periods H. The control over the value and timing of word VCRMOD during each of the several periods H is accomplished by microprocessor 306.

After the change in the phase of word $CT_1$ at instant $T_4$ of FIG. 2d, each word $CT_1$ is in phase with the corresponding pulse $h_{s2}$ of FIG. 2c. Each word $CT_1$ of FIG. 2d remains in phase until after an instant $T_5$ when the next VTR head switching occurs. After instant $T_5$, the phase of word $CT_1$ of FIG. 2d relative to the corresponding pulse $h_{s1}$ of FIG. 2c changes in a manner that is similar to that occurring after instant $T_1$ but in an opposite direction. Consequently, arrangement 120 of FIG. 1 supplies word VCRMOD at a value that causes a phase shift in word $CT_1$ of FIG. 2d in a way similar to that described before.

It should be understood that microprocessor 306 of FIG. 1 may be responsive to a vertical signal $V_s$ generated by separator 60 for modifying word VCRMOD only during vertical retrace when the VTR head switching may occur.

In arrangement 120, decoder 23 generates corresponding control signals $DC_n$ that control averager 300 and register 301, 302 and 307. The timings of control signals $DC_n$ are determined in accordance with the timings of word CT. It should be understood that in another embodiment of the invention that is not shown in the FIGURES, a microprocessor that is coupled to receive horizontal sync pulse $H_s$ may perform the entire operation of arrangement 120 and/or generate the control signals that control the PLL.

Assume that the phase of pulses $H_s$ of FIG. 1 is constant but that PLL 20 is not locked-in to pulses $H_s$. In this case, the condition, signal PHCNGE=TRUE, may be detected by microprocessor 306 as long as PLL 20 is not locked-in. When lock-in occurs, the condition, signal PHCNGE=FALSE, is detected. However, at that time, word VCRMODB, representing a steady state phase difference, unlike in the situation discussed before, is already zero. Therefore, word VCRMOD will remain unmodified at the value zero. Thus, advantageously, arrangement 120 may be designed in such a way that it does not affect PLL 20 unless a stable phase shift occurs in pulses $H_s$. Such stable phase shift may be caused, for example, by the switching of the heads in the VTR.

What is claimed:

1. A phase-lock-loop circuit of a television apparatus, comprising:
   a source of a synchronizing input signal at a given phase;
   a controllable generator responsive to said input signal for generating a periodic output signal at a frequency that is related to the frequency of said input signal and at a phase that is controlled in accordance with said given phase of said input signal;

a phase detector responsive to said output and input signals for producing a signal that is indicative of a phase difference therebetween;

a low-pass filter responsive to said phase difference indicative signal for producing, in accordance therewith, a first signal that is coupled to said generator to form a feedback loop path for controlling said phase of said output signal such that, when a change between said given phase of said input signal and said phase of said output signal occurs, said first signal varies to cause a corresponding change in said phase of said output signal in a manner that reduces the phase difference between said input and output signals for synchronizing said output to said input signal; and means coupled to said feedback loop path between said phase detector and said low-pass filter for generating, in accordance with the phase difference that is contained in said phase difference indicative signal, a second signal when said change in said phase difference indicative signal meets a predetermined criterion, said second signal being coupled to said generator to cause at least a portion of said change in said phase of said output signal that synchronizes said output to said input signal.

2. An apparatus according to claim 1 wherein said second signal is generated when a rate of said change in said phase difference indicative signal is greater than a first predetermined value such that, after said change in said phase difference indicative signal occurs, said rate of change in said phase difference indicative signal becomes smaller than a second predetermined value.

3. An apparatus according to claim 1 wherein said source of said input signal is derived from a video tape recorder having a plurality of signal reproducing magnetic heads that reproduce said input signal and wherein said second signal is generated when switching of the heads in said video tape recorder occurs that causes said phase of said input signal to change relative to said phase of said input signal after the time the switching of the heads occurs.

4. An apparatus according to claim 1 wherein when said criterion is met, said second signal generating means establishes said second signal at a corresponding value that is indicative of a magnitude of the phase difference such that a magnitude of said portion of said change in said phase of said output signal that is caused by said second signal is substantially unaffected by said feedback loop path after said value of said second signal is established.

5. An apparatus according to claim 1 wherein said input signal is at the horizontal deflection frequency.

6. An apparatus according to claim 5 wherein said second signal generating means is responsive to a signal at a vertical rate to generate said second signal only during vertical retrace.

7. An apparatus according to claim 1 wherein said second signal generating means is responsive to said signal that is produced by said phase detector for generating therefrom said second signal that is coupled to said generator in a manner that bypasses said low-pass filter.

8. An apparatus according to claim 1 further comprising, combining means responsive to said first and second signals for combining said first and second signals to produce a third signal that is coupled to said generator to control said phase of said output signal such that said phase of said output signal is simultaneously affected by corresponding values of each of said first and second signals.

9. An apparatus according to claim 1 wherein said second signal generating means generates said second signal after a change in said given phase of said input signal occurs that results in said input signal being at a phase that is stable and that is shifted relative to said phase of said output signal.

10. An apparatus according to claim 1 wherein said controllable generator comprises sequential means for generating said output signal in accordance with a sequence of states that change in synchronism with a clock signal and wherein said second signal causes said sequence of states that corresponds with a corresponding period of said input signal to vary in accordance with said second signal.

11. An apparatus according to claim 10 wherein said sequential means performs a function analogous to that of an oscillator of an analog phase-lock-loop circuit.

12. An apparatus according to claim 10 wherein when said change in said phase of said output signal that is caused by said second signal occurs, it occurs abruptly and in synchronism with said clock signal.

13. An apparatus according to claim 1 wherein said second signal causes changes in said phase of said output signal when said predetermined criterion is detected by an amount that is related to an amount by which the phase difference is different from a steady state value of the phase difference.

14. An apparatus according to claim 1 wherein said first signal is indicative of a length of a given period of said output signal, and wherein said first signal remains substantially unaffected when said change in said phase difference indicative signal occurs that meets said predetermined criterion.

15. A phase-lock-loop circuit of a television apparatus, comprising:

a source of a synchronizing input signal at a frequency that is related to a deflection frequency and at a given phase;

a source of a clock signal;

sequential means responsive to said clock signal for generating a periodic output signal, said output signal containing, in a given period thereof, a sequence of states such that a change of state in said sequence occurs in synchronism with said clock;

a phase detector responsive to said output and input signals for generating a signal that is indicative of a phase difference therebetween;

a low-pass filter responsive to said signal that is generated by said phase detector for generating a first signal that is coupled to said generator that varies the number of said states in said sequence of said output signal, in accordance with the phase difference, such that said generator, loop filter and phase detector form a feed-back loop arrangement that synchronizes said output to said input signal; and means responsive to said signal that is generated by said phase detector for generating a second signal when a change of phase is said input signal occurs that meets a predetermined criterion, said second signal being coupled to said sequential means for varying said phase of said output signal, in accordance with the phase difference, in a manner that speeds up the synchronization of said output to said input signal.

16. An apparatus according to claim 15 wherein said second signal generating means comprises means responsive to said signal that is generated by said phase detector for generating said second signal, provided that said change in said phase of said input signal causes the phase difference to exceed its steady state value by a first predetermined amount, and provided that after such change occurs in said phase of said input signal, said phase of said input signal remains substantially constant.

17. An apparatus according to claim 15 wherein said second signal generating means generates said second signal that causes the number of states in said sequence of said given period to vary by an amount that is determined in accordance with the phase difference.

18. An apparatus according to claim 15 wherein said second signal reduces a transient variation in said first signal.

19. An apparatus according to claim 15 wherein variation of said phase of said output signal that is caused by said second signal occurs in a manner that bypasses said filter.

20. An apparatus according to claim 15 wherein said second signal generating means comprises a microprocessor.

21. An apparatus according to claim 15 wherein said second signal generating means comprises means responsive to said phase difference indicative signal for generating said second signal at a value that is in accordance with a difference between the phase difference resulting from said change in said phase of said input signal and a steady state value of the phase difference.

22. An apparatus according to claim 15 wherein said second signal generating means comprises means responsive to said phase difference indicative signal for generating a third signal when a rate of change of said phase difference indicative signal is greater than a first predetermined magnitude and fourth signal when said rate of change of said phase difference indicative signal is smaller than a second predetermined magnitude and means responsive to said third and fourth signals for generating said second signal when said fourth signal occurs after an occurrence of said third signal.

23. An apparatus according to claim 15 wherein said second signal generating means comprises means for generating a third signal that is indicative of a running average of said phase difference indicative signal.

24. An apparatus according to claim 15 wherein said second signal causes an abrupt shift in said phase of said output signal after said predetermined criterion is met to synchronize said output to said input signal such that a long transient state in said first signal is prevented.

25. An apparatus according to claim 22 wherein variation of said phase of said output signal that is caused by said second signal causes the phase difference between said output and input signals that occurs during a transient state to become equal immediately to a steady-state value of the phase difference.

* * * * *